(12) United States Patent
Plunkett et al.

(10) Patent No.: US 8,296,037 B2
(45) Date of Patent: Oct. 23, 2012

(54) METHOD, SYSTEM, AND APPARATUS FOR REDUCING A TURBINE CLEARANCE

(75) Inventors: Timothy T. Plunkett, Port Orange, FL (US); John E. Hershey, Ballston Lake, NY (US); Brock E. Osborn, Niskayuna, NY (US); Kenneth E. Seitzer, Cincinnati, OH (US); Keith K. Taylor, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1356 days.

(21) Appl. No.: 12/143,420

(22) Filed: Jun. 20, 2008

(65) Prior Publication Data
US 2009/0319150 A1   Dec. 24, 2009

(51) Int. Cl.
*F01D 11/08* (2006.01)

(52) U.S. Cl. .......................................... 701/100; 60/782

(58) Field of Classification Search .................. 701/99, 701/100, 3, 14; 415/1, 115, 116, 173.1, 173.2, 415/176, 177; 60/782, 785, 806
See application file for complete search history.

(56) References Cited

U.S. PATENT DOCUMENTS

| | | | |
|---|---|---|---|
| 4,069,662 A | 1/1978 | Redinger, Jr. et al. | |
| 4,230,436 A | 10/1980 | Davison | |
| 4,304,093 A | 12/1981 | Schulze | |
| 4,329,114 A | 5/1982 | Johnston et al. | |
| 4,513,567 A | 4/1985 | Deveau et al. | |
| 4,576,547 A | 3/1986 | Weiner et al. | |
| 4,632,635 A | 12/1986 | Thoman et al. | |
| 4,648,241 A | 3/1987 | Putman et al. | |
| 4,856,272 A | 8/1989 | Putman et al. | |
| 4,893,983 A | 1/1990 | McGreehan | |
| 4,893,984 A * | 1/1990 | Davison et al. | 415/48 |
| 4,928,240 A | 5/1990 | Davison et al. | |
| 4,999,991 A | 3/1991 | Haddad et al. | |
| 5,005,352 A | 4/1991 | Schwarz et al. | |

(Continued)

FOREIGN PATENT DOCUMENTS

EP   1754861 A2   2/2007

(Continued)

OTHER PUBLICATIONS

A Search Report under Section 17(5), Intellectual Property Office, London, England for copending GB patent application No. GB0910396.1 (5 pages).

*Primary Examiner* — Richard M. Camby
(74) *Attorney, Agent, or Firm* — David J. Clement, Esq.; Armstrong Teasdale LLP (57) ABSTRACT

Methods, systems, and apparatus for controlling a turbine clearance in an aircraft engine are provided. A method includes activating a turbine clearance control based on a flight phase of an aircraft using the aircraft engine, and adjusting the turbine clearance based on a preselected turbine clearance value.

19 Claims, 5 Drawing Sheets

U.S. PATENT DOCUMENTS

| | | | |
|---|---|---|---|
| 5,076,050 A | 12/1991 | Schwarz et al. |
| 5,081,830 A | 1/1992 | Schwarz et al. |
| 5,088,885 A | 2/1992 | Schwarz et al. |
| 5,090,193 A | 2/1992 | Schwarz et al. |
| 5,104,287 A | 4/1992 | Ciokajlo |
| 6,126,390 A | 10/2000 | Boeck |
| 6,626,635 B1 | 9/2003 | Prowse et al. |
| 7,079,957 B2 | 7/2006 | Finnigan et al. |
| 7,165,937 B2 | 1/2007 | Dong et al. |
| 2005/0109016 A1 | 5/2005 | Ullyott |

FOREIGN PATENT DOCUMENTS

| | | |
|---|---|---|
| EP | 2025878 A2 | 2/2009 |
| GB | 2233399 A | 1/1991 |
| GB | 2310255 A | 8/1997 |
| WO | 9211444 A1 | 7/1992 |

* cited by examiner

METHOD, SYSTEM, AND APPARATUS FOR REDUCING A TURBINE CLEARANCE

BACKGROUND OF THE INVENTION

The subject matter disclosed herein relates generally to aircraft engines and, more specifically, to controlling a turbine clearance within an aircraft engine to facilitate more efficient operation of the aircraft engine during operations.

At least some known aircraft engines include a turbine including a hot section and a cold section. To improve fuel efficiency, thrust, and/or turbine life, at least some known engines attempt to control a distance or clearance between a tip of each turbine blade and a surrounding shroud to a minimum. However, a blade tip length, as measured from a rotor center, may increase in proportion to the square of an angular velocity of the rotor, and linearly with temperature. Both of such effects may be caused by increasing fuel flow during maneuvers such as climbs, certain acts in the descent/landing sequence, and/or evasive actions. Moreover, the blade tip length may increase more rapidly than the shroud expands during operation, especially during transient operations, such as those that require increased fuel flow. As such, during such operations, the blade tip may make contact with the shroud in a condition known as a rub.

At least some known aircraft engines use active clearance control to prevent rubs. Active clearance control, in at least some known embodiments, attempts to cause the shroud to expand linearly by bathing the shroud in hot air, based on similar physical properties that cause the blade tip length to expand linearly with an increase in temperature. However, a time constant that describes a rate of blade tip length growth is generally markedly different than a time constant that describes a rate of shroud expansion, such that the blade tip length generally increases more rapidly.

At least some known aircraft engines activate a clearance control in response to one or more engine operating parameters. Moreover, at least some known aircraft engines activate a clearance control based on an elapsed time relative to a transient engine condition, such as a throttle burst and/or a change in rotor speed. Further, at least some known aircraft engines deactivate a clearance control based on, for example, an aircraft altitude. In addition, other known active clearance controls are based on mathematical models based on data acquired from one or more aircraft engines. However, such controls may not adequately anticipate an increase in fuel flow in order to start shroud expansion prior to the increase in the blade tip length. For example, during flights occurring over international waters and having little or no radar contact, aircraft are separated by a minimum distance and managed such that the minimum distance continues for an entirety of such a portion of the flight. Transient operations are rare during such flight portions. Accordingly, it is desirable to provide a method, system, and/or apparatus that controls turbine clearance based on engine parameter rates of change and/or a presence of the aircraft in a stable flight phase.

BRIEF DESCRIPTION OF THE INVENTION

In one aspect, a method for controlling a turbine clearance in an aircraft engine is provided. The method includes activating a turbine clearance control based on a flight phase of an aircraft using the aircraft engine, and adjusting the turbine clearance based on a preselected turbine clearance value.

In another aspect, a turbine clearance control system for use with an aircraft engine is provided. The system includes a switch, a notification device, and a controller coupled to the switch and to the notification device. The controller is configured to activate the turbine clearance control system based on a flight phase of an aircraft using the aircraft engine, and adjust a turbine clearance within the aircraft engine based on a preselected turbine clearance value.

In another aspect, an apparatus for controlling a turbine clearance in an aircraft engine is provided. The apparatus includes a steady-state condition switch configured to receive an input and, in response to the input, transmit a preselected turbine clearance value to a turbine controller that is communicatively coupled to the switch, wherein the controller adjusts the turbine clearance based on the preselected turbine clearance value. The apparatus also includes a notification device communicatively coupled to the switch, wherein the notification device is configured to communicate information relating to an operation status of the apparatus based at least partially on a status of the switch.

DETAILED DESCRIPTION OF THE INVENTION

Figure 1:
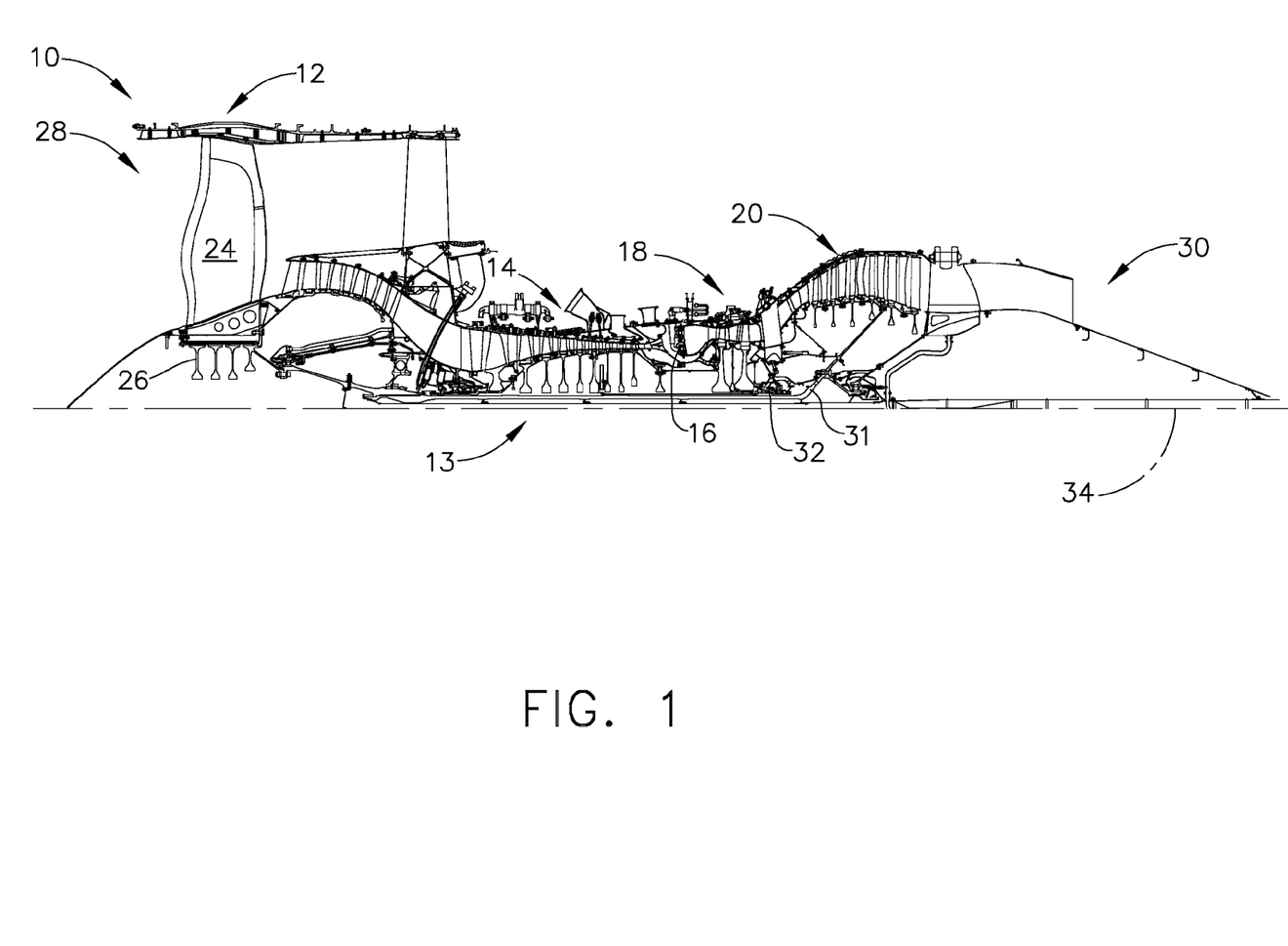
FIG. 1 is a schematic illustration of an exemplary gas turbine engine.

FIG. 1 is a schematic illustration of a gas turbine engine 10 that includes, in an exemplary embodiment, a fan assembly 12 and a core engine 13 including a high pressure compressor 14, a combustor 16, and a high pressure turbine 18. Engine 10 also includes a low pressure turbine 20. Fan assembly 12 includes an array of fan blades 24 extending radially outward from a rotor disk 26. Engine 10 has an intake side 28 and an exhaust side 30. Fan assembly 12 and low pressure turbine 20 are coupled by a low speed rotor shaft 31, and compressor 14 and high pressure turbine 18 are coupled by a high speed rotor shaft 32.

During operation, air flows axially through fan assembly 12, in a direction that is substantially parallel to a central axis 34 extending through engine 10, and compressed air is supplied to high pressure compressor 14. The highly compressed air is delivered to combustor 16. Combustion gas flow (not shown in FIG. 1) from combustor 16 drives turbines 18 and 20. Turbine 18 drives compressor 14 by way of shaft 32 and turbine 20 drives fan assembly 12 by way of shaft 31.

Figure 2:
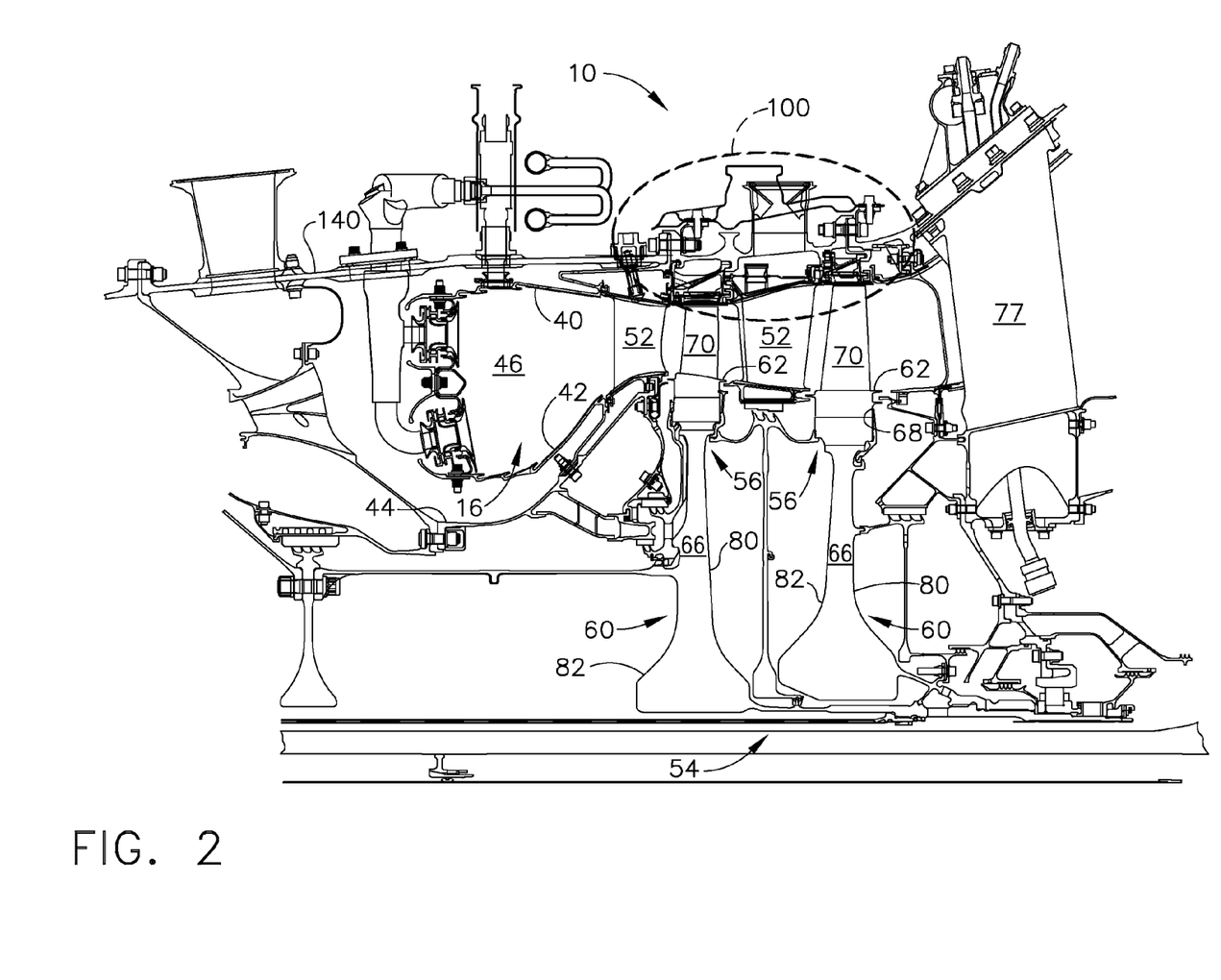
FIG. 2 is an enlarged cross-sectional schematic illustration of a portion of the gas turbine engine shown in FIG. 1 including a clearance control system.
Figure 3:
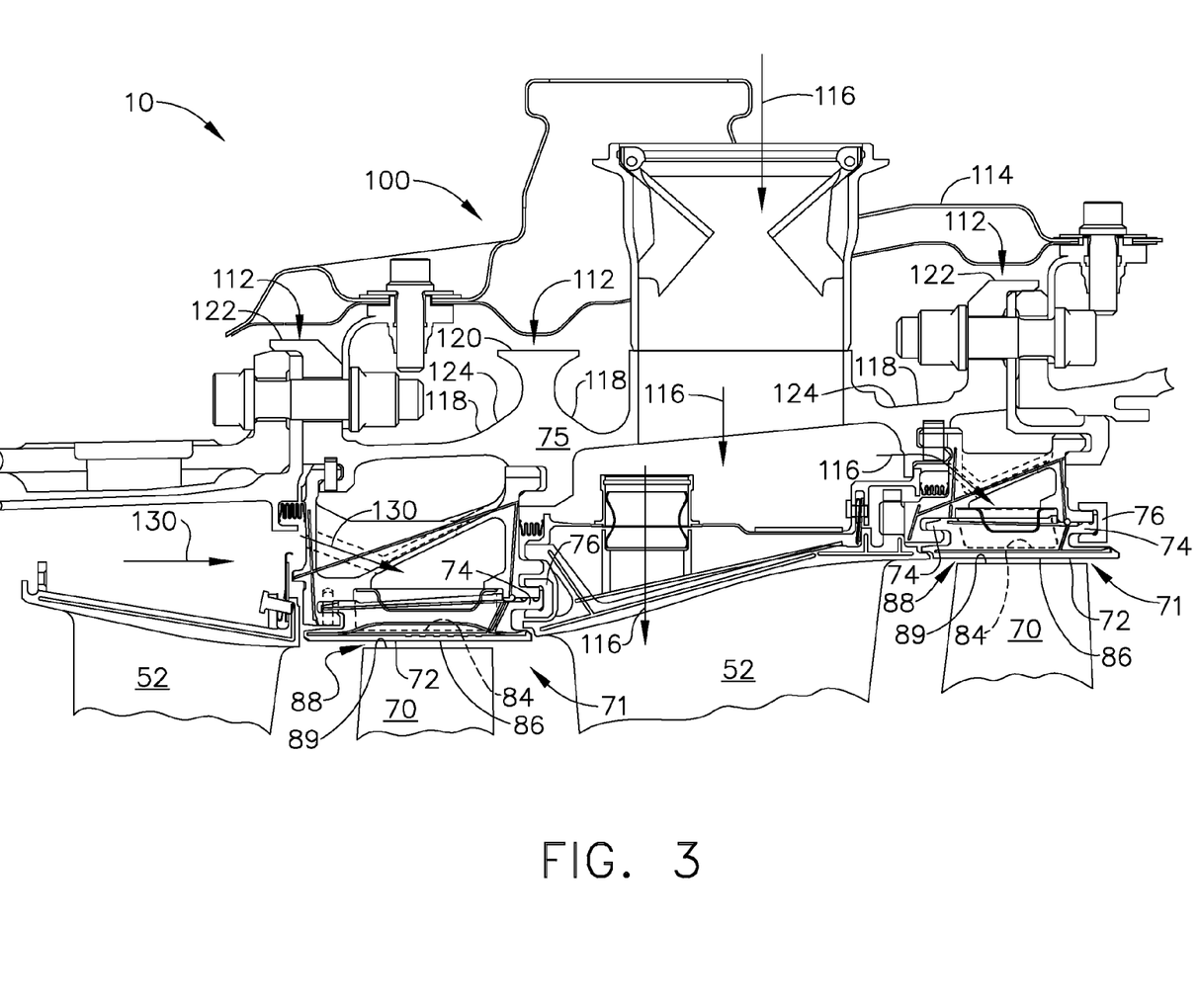
FIG. 3 is an enlarged cross-sectional schematic illustration of the clearance control system shown in FIG. 2.

FIG. 2 is an enlarged cross-sectional schematic illustration of a portion of gas turbine engine 10 including a clearance control system 100. FIG. 3 is an enlarged cross-sectional schematic illustration of clearance control system 100. In the exemplary embodiment, high pressure turbine 18 is coupled substantially coaxially with, and downstream from, compressor 14 (shown in FIG. 1) and combustor 16. Turbine 18 includes a rotor assembly 54 that includes at least one rotor 56 that is formed by one or more disks 60. In the exemplary embodiment, disk 60 includes an outer rim 62, and an integral web 66 extending generally radially therebetween and radially inward from a respective blade dovetail slot 68. Each disk 60 also includes a plurality of blades 70 extending radially outward from outer rim 62. Disk 60 includes an aft surface 80 and an upstream surface 82.

Circumscribing the row of high pressure blades 70, and in close clearance relationship therewith, is an annular shroud or static casing assembly 71. In the exemplary embodiment, shroud assembly 71 is radially inward from a surrounding turbine casing 75 and includes a plurality of shroud members or arcuate sectors 72 coupled to shroud hangers 74 and to a C-clip 76. Adjacent shroud members 72 are coupled together to such that members 72 circumscribe blades 70.

Each shroud member 72 includes a radially outer surface 84 and an opposite radially inner surface 86. A clearance gap 88 is defined between shroud inner surface 86 and tips 89 of rotor blades 70. More specifically, clearance gap 88 is defined as the distance between turbine blade tips 89 and an inner surface of turbine shroud 72.

Clearance control system 100 facilitates controlling clearance gap 88 during engine operation. More specifically, in the exemplary embodiment, clearance control system 100 facilitates controlling gap 88 between rotor blade tips 89 and shroud member inner surfaces 86. Clearance control system 100 is coupled in flow communication to a cooling air supply source via a manifold 114. Cooling air exits manifold 114 and impinges on surfaces 120 and 122 extending from casing 75. The cooling air supply source may be any cooling air supply source that enables clearance control system 100 to function as described herein, such as, but not limited to, fan air, an intermediate stage of compressor 14, and/or a discharge of compressor 14. In the exemplary embodiment, cooling air 116 is bled from an intermediate stage of compressor 14 for cooling stage 2 nozzles and surrounding shrouds.

In the exemplary embodiment, manifold 114 extends circumferentially about turbine casing 75 and enables cooling air 112 to impinge against surfaces 120 and 122 substantially uniformly. The thermal radial displacement of surfaces 120 and 122 facilitates limiting casing displacement, and thus facilitates control of clearance gap 88. Casing 75 extends substantially circumferentially and includes at least some portions of external surface 118, i.e., see for example, surfaces 120, 122, and/or 124, that are positioned in flow communication with cooling air discharged from manifold 114. In one embodiment, surfaces 120 and 122 extend over portions of clearance control system 100 components such as, but not limited to, turbine casing, rings, and/or flanges.

During engine operation, compressor discharge pressure air 130 is channeled from compressor 14 towards shroud assembly 71 and clearance gap 88. In addition, cooling air 116 is directed through turbine casing 75. As such, compressor discharge pressure air 130 and/or cooling air 116 facilitate cooling at least one stage 2 nozzle of turbine 18, and/or a stage 2 shroud assembly 71, and/or facilitate purging turbine middle seal cavities (not shown). The combination of cooling air 116, compressor discharge pressure air 130, and/or external cooling of casing 75 facilitates enhanced control of clearance gap 88 and facilitates increasing the heat transfer effectiveness of casing surfaces 120 and/or 122. As a result of the increased effective heat transfer of clearance control system 100, clearance gap 88 is facilitated to be more effectively maintained than is controllable using known clearance control systems. Moreover, the improved clearance gap control is achievable without increasing the amount of air 112, 116, and/or 130 supplied to clearance control system 100. As a result, turbine efficiency is facilitated to be increased while fuel burn is facilitated to be reduced.

It should be noted that, although FIGS. 2 and 3 describe a clearance control system that uses cool air to control a turbine clearance, any suitable clearance control system may be used in accordance with the embodiments described herein. For example, a clearance control system may use hot air to control turbine clearance. As such, as used to describe the embodiments disclosed herein, a clearance control system may be either a system that uses cool air or a system that uses hot air.

Moreover, as used herein, the term "minimum clearance" refers to a minimum distance associated with clearance gap 88 that may be set without probability of a rub. A minimum clearance is a function of several variables including, but not limited to only including, turbine major axis out-of-round tolerance, vibrational induced movements, fuel flow, core speed, and engine gas temperatures.

Figure 4:
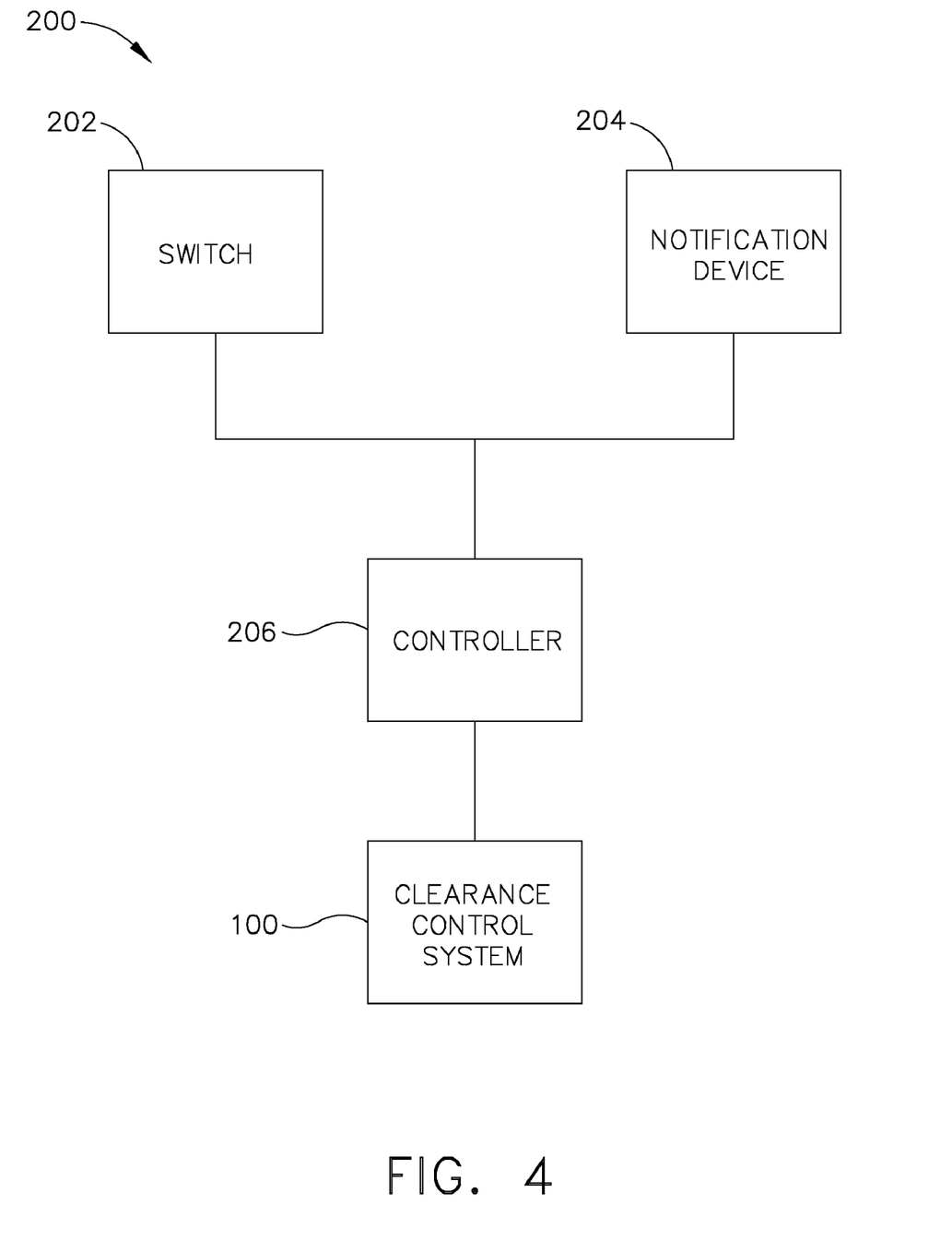
FIG. 4 is a block diagram of an exemplary active clearance control system that includes the clearance control system shown in FIGS. 2 and 3.

FIG. 4 is a block diagram of an exemplary active clearance control system 200 that includes clearance control system 100 (shown in FIGS. 2 and 3). In the exemplary embodiment, active clearance control system 200 also includes a switch 202, a notification device 204, and a controller 206 that is coupled to clearance control system 100, switch 202, and notification device 204. Switch 202, in the exemplary embodiment, is a binary control that, upon enablement, activates clearance control system 100. More specifically, switch 202 is a steady-state condition switch and may be implemented by, for example, any bistable or two-position switch such as, but not to be limited to, a toggle switch, a toggling button, a slide switch, a rotary switch, or a rocker switch. Moreover, switch 202 may be implemented by, for example, a touchscreen switch such as is found in glass cockpit touchscreens. Further, switch 202 may be implemented as a pair of complementary buttons arranged such that depression of one button causes one of two states to be selected, while depression of the other button causes the other of the two states to be selected. In addition, switch 202 may be controlled using voice recognition software.

In the exemplary embodiment, notification device 204 communicates information to an aircraft operator relating to an activation status of clearance control system 100 as defined by a position of switch 202 and/or operating information of clearance control system 100. Such a status and/or information may include, but is not limited to only including, whether clearance control system 100 has been activated or deactivated, a time at which the aircraft operator should deactivate clearance control system 100, a time duration from a previous activation of clearance control system 100, and an advisory that may potentially affect maintenance of clearance control system 100 while enabled, such as structural vibration that may motivate the operator to change altitude. Notification device 204 may be implemented by, for example, a light that, when lit, informs the operator that clearance control system 100 is activated. In an alternative embodiment, notification device 204 may be implemented by a pair of lights such that, when clearance control system 100 is activated a first light is lit and a second light is not lit. In further alternative embodiments, notification device 204 may be a meter, a screen icon, or any other suitable device for visually communicating a status of clearance control system 100 as defined by a position of switch 202. Moreover, notification device 204 may aurally communicate the status of clearance control system 100 using, for example, a bell, a chime, a synthesized voice, a buzzer, a tone, a click, and/or a synthesized waveform.

In the exemplary embodiment, controller 206 is coupled, such as operatively and/or communicatively coupled, to switch 202 and notification device 204. Controller 206 may be embodied in, for example, a microprocessor, conventional processor, controller, microcontroller, state machine, and/or combination of computing devices, a digital signal processor ("DSP"), an application specific integrated circuit ("ASIC"), a field programmable gate array ("FPGA"), or other programmable logic device, discrete gate or transistor logic, discrete hardware components, and/or any combination thereof that is designed to perform the functions described herein. Controller 206 is configured to determine whether the aircraft is in a stable flight phase, which is a portion of a flight in which engine parameters such as fuel flow, core speed, and/or exhaust gas temperature are not expected to exhibit significant rates of change for an extended period of time. Such a flight phase is typically encountered during a flight over international waters. Controller 206 is also configured to activate and/or deactivate clearance control system 100 during a stable flight phase based on, for example, a position of switch 202.

During operation, clearance control system 100 is enabled by a change in status of switch 202. In one embodiment, an operator manually enables clearance control system 100 using switch 202. In an alternative embodiment, clearance control system 100 is enabled remotely by an operator using switch 202. For example, an operator in a different aircraft may communicate with active clearance control system 200 in order to transmit an enabling command to switch 202, thereby enabling clearance control system 100. Similarly, an air traffic controller may communicate remotely with active clearance control system 200 in order to transmit an enabling command to switch 202, thereby enabling clearance control system 100. In the exemplary embodiment, the operator may override enablement of clearance control system 100 using switch 202. For example, if clearance control system 100 is remotely enabled, the operator may disable clearance control system 100 if necessary for safe and prudent operation of the aircraft.

In the exemplary embodiment, after clearance control system 100 is enabled, controller 206 measures one or more engine parameters such as, for example, fuel flow, core speed, and/or exhaust gas temperature. Controller 206 also determines a rate of change for each measured engine parameter, and compares each determined rate of change to a known rate of change that corresponds to a stable flight phase. More specifically, controller 206 determines whether the aircraft is in a stable state and is expected, based on each determined rate of change, to remain in a stable state for a preselected period of time. Controller 206 thus determines whether the aircraft is in a stable flight phase. If the aircraft has not entered a stable flight phase, at a preselected time period, controller 206 repeats the engine parameter measurements and comparisons.

In the exemplary embodiment, when controller 206 determines that the aircraft is in a stable flight phase, controller 206 activates clearance control system 100. When clearance control system 100 has been activated notification device 204 displays the activation status to the operator. Clearance control system 100 measures a current turbine clearance and compares the current turbine clearance to a preselected turbine clearance. Clearance control system 100 then adjusts the current turbine clearance to match the preselected turbine clearance. The current turbine clearance may be adjusted by, for example, bathing the shroud in either hot air or cold air. In the exemplary embodiment, the operator may override activation of clearance control system 100 using switch 202. For example, if clearance control system 100 is remotely enabled, the operator may deactivate clearance control system 100 if necessary for safe and prudent operation of the aircraft.

In the exemplary embodiment, controller 206 deactivates clearance control system 100 at a preselected time prior to an end of the stable flight phase. The preselected time prior to the end of the stable flight phase may be associated with, for example, a distance from a destination of the aircraft and/or a transponder signal received from another aircraft or ground control.

Figure 5:
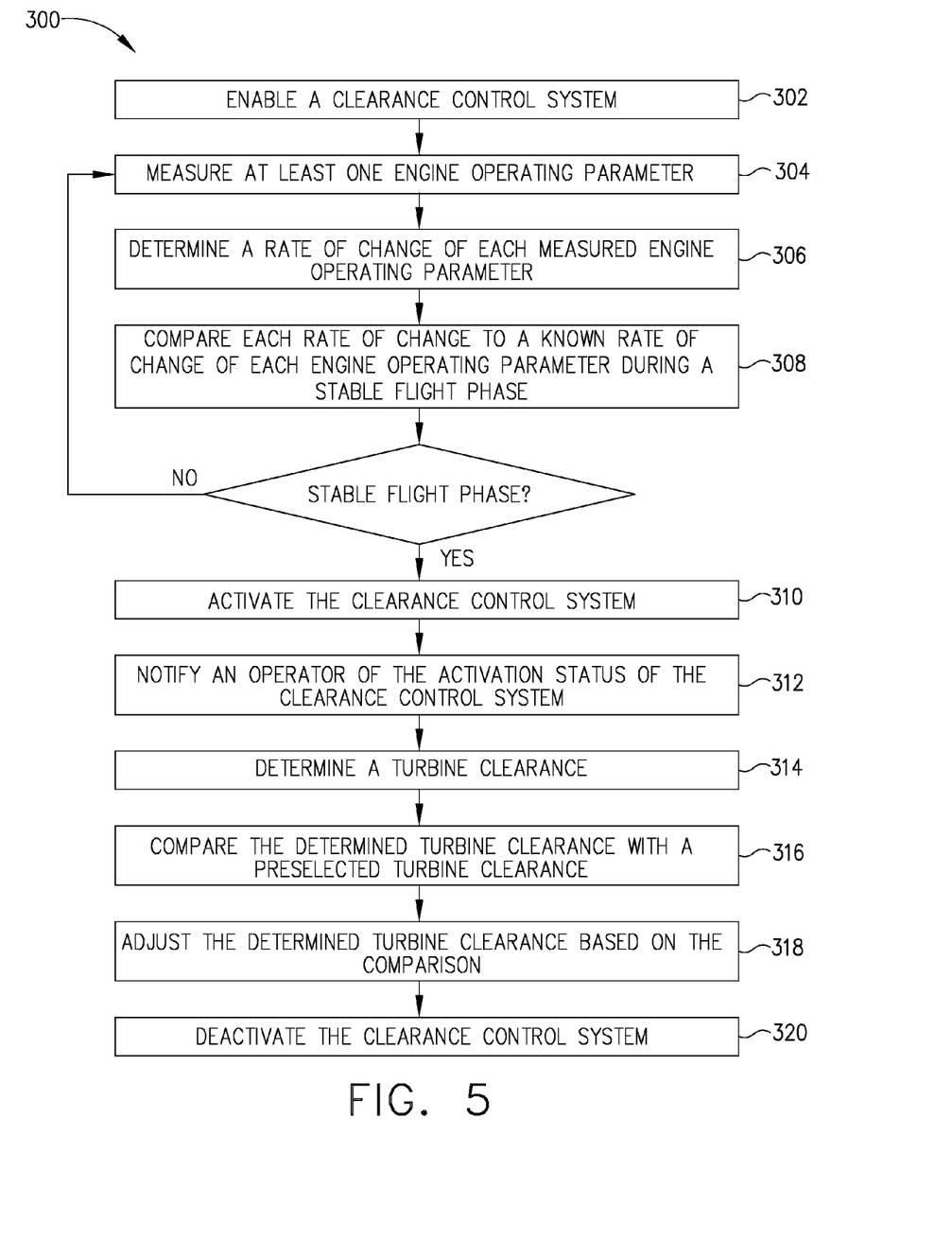
FIG. 5 is a flowchart illustrating an exemplary method of controlling a turbine clearance in an aircraft engine, such as the gas turbine engine shown in FIG. 1.

FIG. 5 is a flowchart 300 illustrating an exemplary method of controlling a turbine clearance in an aircraft engine, such as engine 10 (shown in FIG. 1). More specifically, flowchart 300 illustrates a method of controlling a turbine clearance using active clearance control system 200 (shown in FIGS. 2-4).

In the exemplary embodiment, clearance control system 100 is enabled 302 by a change in status of switch 202. In one embodiment, an operator manually enables clearance control system 100 using switch 202. In an alternative embodiment, clearance control system 100 is enabled remotely by an operator using switch 202. For example, an operator in a different aircraft may communicate with active clearance control system 200 in order to transmit an enabling command to switch 202, thereby enabling clearance control system 100. Similarly, an air traffic controller may communicate remotely with active clearance control system 200 in order to transmit an enabling command to switch 202, thereby enabling clearance control system 100.

In the exemplary embodiment, after clearance control system 100 is enabled, controller 206 measures 304 one or more engine parameters such as, for example, fuel flow, core speed, and/or exhaust gas temperature. Controller 206 also determines 306 a rate of change for each measured engine parameter, and compares 308 each determined rate of change to a known rate of change that corresponds to a stable flight phase. More specifically, controller 206 determines whether the aircraft is in a stable state and is expected, based on each determined rate of change, to remain in a stable state for a preselected period of time. Controller 206 thus determines whether the aircraft is in a stable flight phase. If the aircraft has not entered a stable flight phase, at a preselected time period, controller 206 repeats the engine parameter measurements and comparisons.

In the exemplary embodiment, when controller 206 determines that the aircraft is in a stable flight phase, controller 206 activates 310 clearance control system 100. When clearance control system 100 has been activated notification device 204 displays 312 the activation status to the operator. Clearance control system 100 measures 314 a current turbine clearance and compares 316 the current turbine clearance to a preselected turbine clearance. Clearance control system 100 then adjusts 318 the current turbine clearance to match the preselected turbine clearance.

In the exemplary embodiment, controller 206 deactivates 320 clearance control system 100 at a preselected time prior to an end of the stable flight phase. The preselected time prior to the end of the stable flight phase may be associated with, for example, a distance from a destination of the aircraft and/or a transponder signal received from another aircraft or ground control. Moreover, in the exemplary embodiment, the operator may manually deactivate and/or disable clearance control system 100 using switch 202. For example, if clearance control system 100 is remotely enabled, the operator may deactivate and/or disable clearance control system 100 if necessary for safe and prudent operation of the aircraft.

The systems, methods, and apparatus described herein facilitate more efficient operation of an aircraft by reducing turbine clearances by a preselected amount when the aircraft is determined to have entered a stable flight phase and is expected to remain in the stable flight phase for a preselected time period. Reducing turbine clearances facilitates improving fuel efficiency, thrust, and turbine life. Each operation efficiency facilitates saving money on fuel and/or service.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

Exemplary embodiments of systems, methods, and apparatus for controlling a turbine clearance in an aircraft engine are described above in detail. The systems, methods, and apparatus are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and apparatus as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for controlling a turbine clearance in an aircraft engine, said method comprising:
    determining a flight phase of an aircraft;
    measuring at least one engine parameter;
    determining a rate of change of the at least one measured engine parameter; and
    comparing the determined rate of change to a predetermined rate of change of the measured engine parameter associated with the aircraft being in a stable flight phase;
    activating the turbine clearance control based on a flight phase of the aircraft using the aircraft engine; and
    adjusting the turbine clearance based on a preselected turbine clearance value.

2. A method in accordance with claim 1, further comprising enabling a turbine clearance control using a selection switch.

3. A method in accordance with claim 1, wherein activating a turbine clearance control comprises remotely activating the turbine clearance control when the aircraft is determined to be in the stable flight phase.

4. A method in accordance with claim 1, wherein activating a turbine clearance control comprises notifying an operator of the activation status of the turbine clearance control using a notification device.

5. A method in accordance with claim 1, further comprising determining a turbine clearance.

6. A method in accordance with claim 5, wherein adjusting the turbine clearance comprises:
    comparing the determined turbine clearance to the preselected turbine clearance value; and
    adjusting the turbine clearance based on the comparison.

7. A method in accordance with claim 1, further comprising deactivating the turbine clearance control at a preselected time prior to an end of the stable flight phase.

8. A turbine clearance control system for use with an aircraft engine, said system comprising:
    a switch;
    a notification device; and
    a controller coupled to said switch and to said notification device, said controller is configured to:
        activate said turbine clearance control system based on a flight phase of an aircraft using the aircraft engine; and
        adjust a turbine clearance within the aircraft engine based on a preselected turbine clearance value.

9. A turbine clearance control system in accordance with claim 8, wherein said switch is configured to enable operation of said controller in response to an operator input.

10. A turbine clearance control system in accordance with claim 8, wherein said switch is configured to enable operation of said controller in response to an input received from a remote operator.

11. A turbine clearance control system in accordance with claim 8, wherein said notification device is configured to notify an operator of an activation status of said turbine clearance control system using at least one of a display device and an audio device.

12. A turbine clearance control system in accordance with claim 8, wherein said controller is further configured to:
    measure at least one aircraft engine parameter;
    determine a rate of change for the at least one measured aircraft engine parameter;
    compare the determined rate of change to a predetermined rate of change of the at least one aircraft engine parameter, wherein the predetermined rate of change corresponds to a stable flight phase of the aircraft; and
    activate said turbine clearance control system based when the flight phase is a stable flight phase.

13. A turbine clearance control system in accordance with claim 8, wherein said controller is further configured to determine the turbine clearance.

14. A turbine clearance control system in accordance with claim 13, wherein said controller is further configured to compare the determined turbine clearance to the preselected turbine clearance value and adjust the turbine clearance based on the comparison.

15. A turbine clearance control system in accordance with claim 12, wherein said controller is further configured to deactivate said turbine clearance control system at a preselected time prior to an end of the stable flight phase.

16. An apparatus for controlling a turbine clearance in an aircraft engine, said apparatus comprising:
    a steady-state condition switch configured to receive an input and, in response to the input, transmit a preselected turbine clearance value to a turbine controller that is communicatively coupled to said switch, wherein the controller adjusts the turbine clearance based on the preselected turbine clearance value; and
    a notification device communicatively coupled to said switch, said notification device is configured to communicate information relating to an operation status of said apparatus based at least partially on a status of said switch.

17. An apparatus in accordance with claim 16, wherein said switch is further configured to receive the input from at least one of a local operator and a remote operator.

18. An apparatus in accordance with claim 16, wherein said notification device comprises a display device.

19. An apparatus in accordance with claim 16, wherein said notification device comprises an audio device.

* * * * *